United States Patent [19]

Price

[11] 3,971,873

[45] July 27, 1976

[54] METHOD OF PRODUCING HIGH BRIGHTNESS CORROSION RESISTANT FINISH ON THE SURFACE OF ALUMINUM AND ITS ALLOYS

[75] Inventor: Herbert K. Price, Richmond, Va.

[73] Assignee: Reynolds Metals Company, Richmond, Va.

[22] Filed: Apr. 23, 1974

[21] Appl. No.: 463,341

[52] U.S. Cl. .............................. 428/463; 293/71 R; 293/98; 427/162; 427/309; 427/327; 427/388
[51] Int. Cl.² ..................... B32B 15/08; B32B 27/30
[58] Field of Search ................. 260/899; 117/132 B, 117/132 C, 49, 35 R; 29/195 P; 293/71 R, 98; 427/388, 162, 309, 327; 428/463

[56] References Cited
UNITED STATES PATENTS

| | | | |
|---|---|---|---|
| 3,418,274 | 12/1968 | Caplan et al. | 260/899 X |
| 3,427,062 | 2/1969 | Struben | 293/98 X |
| 3,625,737 | 12/1971 | Richezza et al. | 117/35 R |
| 3,814,740 | 6/1974 | Miller | 260/899 X |

*Primary Examiner*—Harry J. Gwinnell
*Attorney, Agent, or Firm*—Glenn, Lyne, Gibbs & Clark

[57] ABSTRACT

Automotive vehicle bumpers and other articles made of heat-treatable age hardenable aluminum base alloys and having a high spectral reflectance of the order of 95–99% are obtained by applying to the surface of the article which has been previously bright-dipped, an organic solvent solution of a resinous coating composition consisting essentially of (a) a terpolymer of vinyl chloride, vinyl acetate, and maleic acid, and (b) a lower alkyl methacrylate monomer, and curing at a temperature between about 250° and 275°F.

11 Claims, No Drawings

METHOD OF PRODUCING HIGH BRIGHTNESS CORROSION RESISTANT FINISH ON THE SURFACE OF ALUMINUM AND ITS ALLOYS

BACKGROUND OF THE INVENTION

This invention relates to aluminum and aluminum base alloy articles having on the surface thereof a high brightness, corrosion resistant finish, and the method for their manufacture. More particularly, the invention relates to aluminum base alloy automotive vehicle bumpers having a synthetic resin lacquer coating on their surface and exhibiting a high degree of spectral reflectivity.

Automotive vehicle bumpers and other wrought articles of trim on automobiles, such as hub caps, grill work, and the like, have been made predominantly of chromium plated steel. Owing to the susceptibility of the chromium plated surfaces to the deleterious effects of weather, salt spray, and atmospheric corrosion, it has been conventional practice to apply to said surfaces a protective film or coating of a synthetic resin lacquer. An example of such a protective coating is that of a mixture of a vinyl resin, an alkyl ester of acrylic or methacrylic acid, and an alkyl-aryl siloxane in solution in organic solvents, which has been specifically proposed for application to chromium plated automobile bumpers.

The recent trend toward lighter weight cars has increasingly directed attention to vehicle bumpers made by forming an aluminum alloy. In comparison with sheet steel bumpers, aluminum alloy bumpers and other automotive parts possess several advantages. These include lighter weight, with attendant saving in fuel consumption, reduced load on the vehicle suspension system, and the ability to eliminate expensive chromium plating. Aluminum alloy bumpers and other parts, whether anodized or otherwise protectively coated, do not corrode materially and do not lose their brightness, thus reducing the need for replacement or refinishing.

Steel vehicle bumpers are conventionally produced bu forming sheet steel of generally uniform thickness to a desired bumper shape by a series of press forming operations. Aluminum vehicle bumpers are produced by forming an extruded aluminum base alloy blank to provide a desired bumper shape. The extrudability of the aluminum bumper blank permits a wide range of profile configurations and designs, and the provision of additional thickness in those cross-sectional areas where it is needed for impact resistance and load capability, as well as increased dimensional stability. By providing areas of increased thickness in the cross-section of the aluminum extrusion, an aluminum bumper can be produced having increased impact and load capacities relative to a steel bumper of comparable size, while at the same time being much lighter in weight. The reduced bumper weight eases handling during manufacture and mounting operatons, and reduces the load on the suspension system of the vehicle, thereby offsetting the added weight of automotive accessories such as air conditioning units in the vehicles.

One mode of aluminum alloy bumper manufacture is to extrude a blank of a suitable alloy for working to produce the desired bumper cross-sectional contour, followed by quenching, and minor shaping operations such as cupping of the terminal ends of the blank. The bumper is then artificially aged, and may thereafter be chemically brightened and anodized to provide the final bumper. Such anodized aluminum alloy bumpers do not corrode readily and do not lose their brightness, thereby reducing the need for replacement or refinishing.

Anodized aluminum bumpers offer the advantage over chromium plated steel bumpers of elimination of the costly chromium plating operation. Moreover, while the underlying steel of a chromium plated steel bumper will be subject to rusting or corrosion if exposed by scratching or other disruption of the chromium plate, requiring replating, aluminum is far less susceptible to this type of damage.

However, anodizing has the drawback of requiring a large investment in equipment and input of constantly more expansive electrical energy. Anodized coatings also tend to limit the spectral reflectance of the anodized metal to 90% or less, usually about 85% to 88%, at least for alloys of adequate strength to be used for vehicle impact bumpers.

Accordingly, in the case of vehicle bumpers and other automotive trim made of aluminum base alloys, where high reflectance factor is a prerequisite, what the art has sought has been a practical and inexpensive method for providing on these articles a tough adherent coating, resistant to corrosive environments, but resulting in increased spectral reflectance.

GENERAL DESCRIPTION OF THE INVENTION

In accordance with the present invention a novel method is provided for protecting the spectral reflectance of aluminum or an aluminum base alloy by the application to the metal surface of a coating composition which not only maintains the surface brightness but at the same time produces a finish which is tough, adherent, and resistant to corrosive environments.

In accordance with a further aspect of the invention, there is provided a novel vehicle bumper or other wrought article of an aluminum base alloy carrying on the surface thereof a synthetic resin coating providing a finish exhibiting a spectral reflectance of at least 95%, and generally in the range of 97% to 98%.

While the method of the invention is applicable to aluminum and a wide range of aluminum base alloys, the practice of the invention will be illustrated with respect to those classes of alloys which are especially suitable for the manufacture of vehicle bumpers and trim. This selection is for the purpose of illustration only, and is not to be regarded as limiting the scope of the invention thereto.

Aluminum base alloys which are particularly suited to the production of bumpers and other trim, and to which the invention is applicable, are those of the Aluminum Association numbered series 7000 and 5000 that are responsive to anodizing and other bright finishing operations. Within the 7000 series, the invention is concerned particularly with Al-Zn-Mg-Cu alloys consisting essentially of aluminum, about 3.5 to 5.5% zinc, about 0.5 to 2% magnesium, and about 0.3 to 1.5% copper by weight, with silicon, iron, and other incidental elements and impurities up to about 0.5% total including manganese, chromium, titanium and zirconium not exceeding 0.05% each and 0.15% total.

The preferred aluminum base alloy for the practice of the invention is that designated as 7016 type alloy containing 4 to 5% zinc, 0.8 to 1.4% magnesium and 0.6 to 1.4% copper, with limits of silicon 0.10% (Max.), iron 0.10% (Max.), titanium 0.03% (Max.), others (including chromium, nickel and zirconium) not exceeding 0.03% each and 0.10% total. These low limits of recyrstallization-inhibiting elements such as chromium, manganese and zirconium, permit the making of extruded and wrought articles having a recrystallized metallurgical structure characterized by resistance to stress corrosion cracking, and adapted to solution treatment, quenching, aging and other operations. The heat-treatable alloys of this type are particularly suitable for the manufacture of vehicle bumpers.

The practice of the invention is also applicable to bright finishing alloys of the 5000 series, exemplified by No. 5657 and No. 5457. Alloy 5457 has the registered composition: Silicon up to 0.08%, iron up to 0.10%, copper up to 0.20%, manganese 0.15–0.45%, magnesium 0.8–1.2%, zinc up to 0.03%, others up to 0.03% each and 0.10% total, balance aluminum. Alloy 5657 has the registered composition: Silicon up to 0.08%, iron up to 0.10%, copper up to 0.10%, manganese up to 0.03%, magnesium 0.6–1.0%, zinc up to 0.03%, gallium up to 0.03%, others up to 0.02% each and 0.05% total, balance aluminum.

When these alloys are provided with an anodized finish, the resulting products exhibit a spectral reflectance of 90% or less.

The synthetic resin coating, to be applied to an aluminum base article, such as a vehicle bumper, in accordance with the invention, comprises an organic solvent solution of (a) a vinyl chloride-vinyl acetate-maleic acid terpolymer, and (b) an alkyl methacrylate ester component.

The relative proportions of the terpolymer and the methacrylate ester are in the range of about 10% to about 40% by weight of terpolymer, to about 60% to 90% methacrylate ester, by weight.

The terpolymer is a copolymer of vinyl chloride and vinyl acetate, containing from 85% to 88% by weight of vinyl chloride and 11% to 14% by weight of vinyl acetate, with which there is interpolymerized a small amount of a dibasic aliphatic acid, namely from 0.7% to 1.2% by weight of maleic acid. A preferred terpolymer composition contains approximately 86% vinyl chloride, 13% vinyl acetate, and 1% maleic acid. This type of vinyl resin terpolymer is sold commercially under the designation VMCH by Union Carbide Corp. and under the designation Exon 470 by Firestone Corporation. This terpolymer contributes a high degree of adhesion to the final coating. It forms a tough and water-white coating.

The methacrylate ester component is either a homopolymer of methyl methacrylate or a copolymer thereof with minor proportions of other higher alkyl methacrylate esters, namely 2 to 6 carbon alkyl esters, such as ethyl, propyl, isopropyl, n-butyl, isobutyl, pentyl, and hexylesters. These methacrylate esters are available commercially under the designation Acryloid B-66 (Rohm and Haas Co.) which is predominantly methyl methacrylate, with from about 2 to 25 percent of other copolymerizable material, namely the higher esters, and possibly some free methacrylic acid. The preferred methacrylate component contains about 98% methyl methacrylate. The inclusion of the methacrylate component in the coating composition enhances the adhesion of the coating to the aluminum alloy, and results in improved flexibility and durability of the coating, and to improved corrosion resistance, and resistance to weathering.

These resin components are readily soluble in a variety of organic solvents commonly used in vinyl and acrylic resin coating compositions, such as methyl ethyl ketone, ethyl acetate, ethyl alcohol, isopropanol, diacetone alcohol, toluene, methyl isobutyl ketone, and mixtures thereof.

These solvents may be combined in any suitable proportions. A preferred solvent mixture is one containing methyl ethyl ketone, ethanol, and toluene, which may be brought to the desired viscosity by addition of diacetone alcohol.

The coating solution may be applied by spraying or rolling. The coating is then dried by convection or infrared heating at a temperature not in excess of 275°F., and preferably between about 250° and 275°F.

The drying temperature is critical and the stated limits should not be exceeded because a higher temperature will adversely affect the properties of the aluminum base alloy from which the bumper or other trim is made. If during coating the temperature appreciably exceeds 275°F., the alloy is annealed and becomes softer. Accordingly, the curing (baking) of the resinous coating must be kept within the range of above 250° to 275°F. to preserve the properties of the metal. Curing time is typically about 15 to 30 minutes.

The application of the resinous coating composition can, however, take place at room temperature.

The coating composition is advantageously prepared by dissolving the vinyl terpolymer in methyl ethyl ketone or other ketone, using a concentration of about 20–25% by weight of terpolymer. This solution is then mixed with a 20–30% solution of the methacrylate ester component in a mixture of ethanol and toluene (20:80 parts by weight). The composition may include coloring agents, such as phthalocyanines and other transparent organic or inorganic pigments.

The viscosity of the coating solution is critical, and must be in the range of about 18 to 20 seconds measured in a No. 4 Ford cup at 80°F. in order to avoid wrinkling or alligatoring when the coating is applied to the metal. This viscosity is achieved and controlled by addition of diacetone alcohol to the above described resin-solvent mixture. The solids content of the final coating composition will generally be about 20–25% by weight.

The resulting solution can be sprayed by conventional spray equipment, using spray line pressure of about 15–30 psi. The volatility of the solution should be such that it will dry to a resinous film when heating at 250°–275°F. in not more than 30 minutes.

The thickness of coating depends upon the number of applications, it being possible to deposit per pass about 0.3 to 0.5 mil thicknesses up to a total of about 1.5 mils.

The coating thus applied imparts to preferred aluminum base alloys a spectral reflectance of from 95% to 99%, making them suitable for use on vehicle bumpers, grills, and other trim.

For determining the reflectance of the coated aluminum articles, there is employed the standard method of test for reflectance of sheet materials set forth in ASTM Designation E 424 – 71. According to this procedure, the measurement of solar energy reflectance (terrestrial) of materials in sheet form is carried out using an integrating sphere spectrophotometer to measure spectral reflectance versus a magnesium oxide standard, over the spectral range from 350 to 2500 nm. The solar energy reflected is obtained by integrating over a standard solar energy distribution curve, using distribution at sea level, air mass 2. Solar reflectance is defined as the per cent of solar radiation (watts/unit area) reflected by the material. Smoked magnesium oxide (MgO) is used as a standard as the closest practicable approximation of the completely reflecting, completely diffusing surface for the region from 300 to 2100 nm.

In preparation for the subsequent application of the coating lacquer, the aluminum article, such as, for example, a vehicle bumper, is preferably first buffed with a buffing wheel, in accordance with conventional practice, to reduce surface blemishes such as scratches or lines left during forming or extruding. The buffed metal is then washed in a soap or detergent bath and rinsed with distilled water to remove any greasy or oily contaminants left during buffing. A suitable detergent is that available commercially under the designation Okite N-S-T, in a concentration of about 10–12 ounces per gallon.

The metal is then subjected to a brightening or bright dip operation by immersing it in a hot aqueous solution containing nitric, phosphoric, and sulfuric acids. A preferred mixture is one containing, by weight: 3% nitric acid, 78–80% phosphoric acid, 1% sulfuric acid, and 17–19% distilled water. This mixture is held at a temperature of about 200°–200°F. and the metal is immersed therein for at least 2 minutes, and up to about 5 minutes. The metal is then rinsed in distilled water. The use of distilled water for this purpose is critical because regular tap water or even deionized water leaves a residue on the metal surface.

The metal is then dipped in a desmutting or deoxidizing bath consisting of 10–15% nitric acid in distilled water. The metal is then rinsed with distilled water, here critical also, and then dried with a warm air blast at a temperature of not less than 250°F. nor more than 400°F. It is then ready for the application of the lacquer coating, as previously described. The baking or curing should be performed in a dust-free convection or other type oven.

DESCRIPTION OF THE PREFERRED EMBODIMENTS

The following example will illustrate the practice of the invention, but is not to be regarded as limiting the invention thereto:

EXAMPLE

A vehicle bumper made of Alloy No. 7016 was buffed, washed in a 10% solution of detergent Okite N-S-T, bright dipped in a solution of 1% sulfuric acid, 3% nitric acid, 80% phosphoric acid, balance distilled water, at 200°F. for 3 minutes, and rinsed with distilled water. The bumper was then desmutted by dipping in a 15% HNO$_3$ solution in distilled water, for 1 minute, rinsed with distilled water, and air dried at 300°F.

A solution of resin coating composition was prepared by dissolving 20% by weight of VMCH terpolymer in methyl ethyl ketone, and this was admixed with a 20% solution of methyl methcrylate in a 20:80 by weight mixture of ethanol and toluene. The viscosity was adjusted to 150 seconds as measured in a No. 4 Ford cup at 80°F. by addition of diacetone alcohol, the solids content of the final adjusted composition being about 20%. The lacquer was sprayed on the bumper surface, and the coated bumper baked and cured in a dust-free oven at a temperature of 260°F. for 30 minutes. The finished coated bumper showed a spectral reflectance of 98% as measured by ASTM method No. E 424–71.

When subjected to the following tests, the coated bumper showed the following performance:
1. Weather-O-Meter — 500 hours — no change
2. Fade-O-Meter — 500 hours — no change
3. Salt Spray — 2000 hours — good condition
4. Gravel-O-Meter — 5 psi. equivalent to anodizing
5. CASS Test — 21 hours — no change
6. Wash Test (detergent obtained from commercial car wash used for bumpers and grills) — equivalent of 280 car washes — no visible change.

What is claimed is:

1. An article composed of aluminum or an aluminum base alloy having a recrystallized metallurgical structure, and having adhered directly on the metal surface thereof a transparent thermoplastic solvent-soluble resinous coating composition consisting essentially of (a) between about 10% and about 40% by weight of a terpolymer of vinyl chloride, vinyl acetate and maleic acid and (b) between about 60% and about 90% by weight of a lower alkyl methacrylate ester polymer, said coated article exhibiting a spectral reflectance of at least 95%.

2. The article of claim 1 in which said terpolymer consists essentially of 85 to 88% by weight of vinyl chloride, 11 to 14% by weight of vinyl acetate, and 0.7 to 1.2% by weight of maleic acid.

3. The article of claim 1 in which said methacrylate ester is predominantly methyl methacrylate.

4. The article of claim 1 in which said coating is applied to an alloy consisting essentially of aluminum, about 3.5 to 5.5% zinc, about 0.5 to 2% magnesium and about 0.3 to 1.5% copper by weight.

5. The article of claim 1 in which said coating is applied to aluminum base alloy 7016 containing 4 to 5% zinc, 0.8 to 1.4% magnesium and 0.6 to 1.4% copper, with limits of silicon 0.10%, iron 0.10%, titanium 0.03%, and with chromium, nickel and zirconium not exceeding 0.03% each and 0.10% total.

6. In a process for maintaining the spectral reflectance of aluminum or an aluminum base alloy having a recrystallized metallurgical structure, and which has been first immersed in an acid brightening bath, rinsed with distilled water, immersed in an acid desmutting bath, rinsed with distilled water, and dried at a temperature in the range of 250°F to 400°F, the steps consisting essentially of:
  a. applying directly to the metal surface a transparent coating composition consisting essentially of an organic solvent solution of (1) between about 10% and about 40% by weight of a terpolymer of vinyl chloride, vinyl acetate and maleic acid, and (2) between about 60% and about 90% by weight of a lower alkyl methacrylate ester polymer; and
  b. drying and curing said coating at a temperature between about 250°F and 275°F for about 15 to 30 minutes, to obtain surface exhibiting a spectral reflectance of at least 95% — has been inserted after "minutes."

7. The process of claim 6 in which said terpolymer consists essentially of 85 to 88% by weight of vinyl chloride, 11 to 14% by weight of vinyl acetate, and 0.7 to 1.2% by weight of maleic acid.

8. The process of claim 6 in which said methacrylate ester is predominantly methyl methacrylate.

9. The process of claim 6 in which said coating solution has a viscosity in the range of 18 to 20 seconds measured in a Ford cup at 80°F.

10. The process of claim 6 in which said coating is applied to an alloy consisting essentially of aluminum, about 3.5 to 5.5% zinc, about 0.5 to 2% magnesium and about 0.3 to 1.5% copper by weight.

11. The process of claim 6 in which said coating is applied to aluminum base alloy 7016 containing 4 to 5% zinc, 0.8 to 1.4% magnesium and 0.6 to 1.4% copper, with limits of silicon 0.10%, iron 0.10%, titanium 0.03% and with chromium, nickel and zirconium not exceeding 0.03% each and 0.10% total.

* * * * *

UNITED STATES PATENT OFFICE
CERTIFICATE OF CORRECTION

Patent No. 3,971,873  Dated July 27, 1976

Inventor(s) Herbert K. Price

It is certified that error appears in the above-identified patent and that said Letters Patent are hereby corrected as shown below:

Column 6, line 61, after "95%", cancel beginning with "-has been inserted" to and including "after 'minutes'" in column 6, line 62.

Signed and Sealed this twelfth Day of July 1977

[SEAL]

Attest:

RUTH C. MASON
Attesting Officer

C. MARSHALL DANN
Commissioner of Patents and Trademarks